United States Patent
Vandewiele et al.

(10) Patent No.: US 11,136,446 B2
(45) Date of Patent: Oct. 5, 2021

(54) NUCLEATING COMPOSITION AND THERMOPLASTIC POLYMER COMPOSITION COMPRISING SUCH NUCLEATING COMPOSITION

(71) Applicants: SAUDI BASIC INDUSTRIES CORPORATION, Riyadh (SA); SABIC Global Technologies B.V., Bergen op Zoom (NL)

(72) Inventors: Kathleen Ann Vandewiele, Diepenbeek (BE); Marc Herklots, Roermond (NL); Jonathan Khashayar Rabiei Tabriz, Geleen (NL); Gerard Jan Eduard Biemond, Brunssum (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 1241 days.

(21) Appl. No.: 14/896,683

(22) PCT Filed: Jun. 17, 2014

(86) PCT No.: PCT/EP2014/062715
§ 371 (c)(1),
(2) Date: Dec. 8, 2015

(87) PCT Pub. No.: WO2014/202604
PCT Pub. Date: Dec. 24, 2014

(65) Prior Publication Data
US 2016/0137810 A1 May 19, 2016

(30) Foreign Application Priority Data

Jun. 20, 2013 (EP) .................................... 13173015
Jun. 20, 2013 (EP) .................................... 13173016
Aug. 19, 2013 (EP) .................................... 13180920
Aug. 19, 2013 (EP) .................................... 13180921
Oct. 7, 2013 (EP) .................................... 13187542

(51) Int. Cl.
*C08K 5/092* (2006.01)
*C08K 3/34* (2006.01)
(Continued)

(52) U.S. Cl.
CPC ............... *C08K 5/092* (2013.01); *C08K 3/34* (2013.01); *C08K 3/346* (2013.01); *C08K 5/098* (2013.01);
(Continued)

(58) Field of Classification Search
CPC .......... C08K 5/092; C08K 3/34; C08K 3/346; C08K 5/098; C08L 23/10; C08L 23/12; C08L 2205/02; C08L 2205/24; C08L 2207/02; Y10T 428/2826; Y10T 428/298; Y10T 428/2982; Y10T 428/31808; Y10T 428/1895; Y10T 428/31902; Y10T 428/31906; Y10T 428/24942; Y10T 428/28; Y10T 428/2991; Y10T 428/24355; Y10T 428/2495; Y10T 428/24975; Y10T 428/265; Y10T 428/269; Y10T 428/2938; Y10T 428/2998; Y10T 428/31678; Y10T 442/60; Y10T 442/68; Y10T 156/10; Y10T 428/1307; Y10T 428/1355; Y10T 428/1362; Y10T 428/1372; Y10T 428/1379; Y10T 428/24983; Y10T 428/24967
USPC .......... 428/36.9, 35.7, 516, 523, 220, 36.92, 428/213, 35.2, 500, 515, 216, 349, 36.91, 428/212, 354, 343, 483, 339, 379, 480, 428/512, 131, 141, 219, 304.4, 327,
(Continued)

(56) References Cited

U.S. PATENT DOCUMENTS 8,642,683 B1 2/2014 Dellock et al.
2003/0176603 A1* 9/2003 Ommundsen ......... C08F 210/16
526/90

(Continued)

FOREIGN PATENT DOCUMENTS

EP 1379368 B1 12/2006
WO WO-2004055101 A1 * 7/2004 ............... B29D 7/01
(Continued)

OTHER PUBLICATIONS

Instron (Instron, "Melt flow rate (MFR, MVR)," p. 1-4, http://www.instron.us/en-us/our-company/library/glossary/m/melt-flow, accessed Jan. 2, 2018).*

(Continued)

*Primary Examiner* — Gerard Higgins
(74) *Attorney, Agent, or Firm* — Cantor Colburn LLP

(57) ABSTRACT

The invention relates to a nucleating composition comprising: (a) a first nucleating agent, which comprises a cyclic dicarboxylate salt compound; and (b) a second nucleating agent, which comprises talc, wherein the cyclic dicarboxylate salt compound has the formula (I).

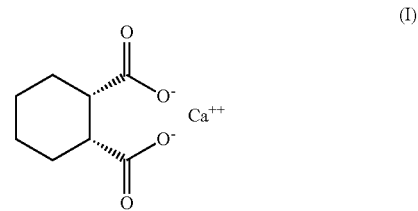

(I)

19 Claims, No Drawings

(51) Int. Cl.

| | | |
|---|---|---|
| C08L 23/10 | (2006.01) | |
| C08L 23/12 | (2006.01) | |
| C08K 5/14 | (2006.01) | |
| C08L 23/16 | (2006.01) | |
| C08K 5/098 | (2006.01) | |

(52) U.S. Cl.
 CPC ............... *C08K 5/14* (2013.01); *C08L 23/10* (2013.01); *C08L 23/12* (2013.01); *C08L 23/16* (2013.01); *C08L 2205/02* (2013.01); *C08L 2205/24* (2013.01); *C08L 2207/02* (2013.01)

(58) Field of Classification Search
 USPC ......... 428/355 EN, 373, 401, 402, 413, 513, 428/517, 522, 910, 167, 17, 201, 318.6, 428/323, 336, 338, 345, 34.1, 34.2, 34.9, 428/355 BL, 35.9, 36.4, 36.6, 375, 411.1, 428/426, 457, 461, 474.4, 476.9, 486, 428/511, 514, 518, 521, 98, 137, 152, 428/172, 174, 194, 195.1, 196, 203, 206, 428/215, 221, 29, 292.1, 306.6, 315.9, 428/318.4, 318.8, 319.7, 319.9, 334, 335, 428/340, 341, 344, 34.3, 34.6, 34.8, 428/355 AC, 357, 35.8, 364, 36.5, 36.8, 428/374, 380, 392, 394, 404, 405, 407, 428/409, 414, 41.3, 420, 424, 424.8, 441, 428/448, 520, 58, 99; 252/511, 500, 609, 252/400.24, 607, 608, 182.14, 403, 506, 252/507, 508, 509, 589, 601; 525/240, 525/53, 190, 106, 64, 186, 192, 193, 197, 525/216, 232, 263, 265, 333.2, 375, 450, 525/52, 88, 95, 98; 215/247, 373; 138/137, 141, 145, 146, 150, 177, 178
 See application file for complete search history.

(56) References Cited

U.S. PATENT DOCUMENTS

| | | | |
|---|---|---|---|
| 2004/0220311 A1 | 11/2004 | Dotson et al. | |
| 2005/0038155 A1* | 2/2005 | Berghmans | C08K 5/0083 524/284 |
| 2005/0101713 A1 | 5/2005 | Lake, Jr. et al. | |
| 2007/0066733 A1 | 3/2007 | Hanssen et al. | |
| 2007/0093605 A1 | 4/2007 | Adur | |
| 2007/0117932 A1* | 5/2007 | De Palo | B32B 1/08 525/240 |
| 2007/0213439 A1 | 9/2007 | Wolters et al. | |
| 2008/0171834 A1 | 7/2008 | Tang et al. | |
| 2011/0136959 A1* | 6/2011 | Brandstetter | C08L 23/10 524/451 |
| 2012/0242003 A1* | 9/2012 | Forgue | C08F 10/06 264/322 |
| 2013/0095267 A1* | 4/2013 | Cavalieri | B32B 1/08 428/36.91 |
| 2013/0253124 A1 | 9/2013 | Bernreiter et al. | |
| 2014/0287215 A1 | 9/2014 | Chandak et al. | |
| 2014/0364553 A1 | 12/2014 | Zhao | |
| 2015/0322215 A1* | 11/2015 | Hallot | C08L 23/12 524/397 |
| 2016/0122505 A1 | 5/2016 | Vandewiele et al. | |
| 2018/0134868 A1 | 5/2018 | Vandewiele et al. | |

FOREIGN PATENT DOCUMENTS

| | | | |
|---|---|---|---|
| WO | 2006071721 A1 | 7/2006 | |
| WO | WO-2011160946 A1 * | 12/2011 | ............... B32B 1/08 |

OTHER PUBLICATIONS

International Search Report and Written Opinion of the International Searching Authority for PCT/EP2014/062714 dated Aug. 14, 2014, 7 pages.
International Search Report and Written Opinion of the International Searching Authority for PCT/EP2014/062715 dated Sep. 11, 2014, 5 pages.
International Search Report of the International Searching Authority for PCT/EP2014/062715 dated Sep. 9, 2014, 3 pages.
Libster, Dima, et al., "Advanced nucleting agents for polypropylene", Polym. Adv. Tech. 2007, 18, 685-695.
Martin F. Ferrage, et al.: "Talc as Nucleating Agent of Polypropylene: Morphology Induced by Lamellar Particles Addition and Interface Mineral-Matrix Modelization", Cedex, France, Journal of Materials Science 37 (2002) 1561-1573.
Jing Cao, et al.: "Polymer Testing: Crystalline Structure, Morphology and Mechanical Properties of b-nucleated Controlled-Rheology Polypropylene Random Copolymers", Fujian, People's Republic of China, 30 (2011) pp. 899-906.

\* cited by examiner

NUCLEATING COMPOSITION AND THERMOPLASTIC POLYMER COMPOSITION COMPRISING SUCH NUCLEATING COMPOSITION

This application is a national stage application of PCT/EP2014/062715 filed Jun. 17, 2014, which claims priority to EP13173016.0 filed Jun. 20, 2013, EP13173015.2 filed Jun. 20, 2013, EP13180921.2 filed Aug. 19, 2013, EP13180920.4 filed Aug. 19, 2013, EP13187542.9 filed Oct. 7, 2013, and EP13187541.1 filed Oct. 7, 2013, all of which are hereby incorporated by reference in their entirety.

The invention relates to a nucleating composition comprising a salt of a metal or organic cation of a cyclic dicarboxylic acid as a first nucleating agent. The invention also relates to a thermoplastic polymer composition comprising said nucleating composition. The invention further relates to a shaped article comprising said thermoplastic polymer composition.

Such a nucleating composition is known from document EP 1379368 B1. This document discloses at least one metal salt of hexahydrophthalic acid (HHPA), e.g. calcium, strontium, lithium and monobasic aluminium salt, to be used as nucleating agent to produce thermoplastic compositions showing improved crystallization behaviour.

Several other documents also disclose metal salts employed as nucleating additives for thermoplastics. For example, US 2004/0220311 A1 discloses the use of a specific hexahydrophthalic acid metal salt, e.g. calcium, strontium, lithium, or monobasic aluminium, as nucleating agent in various thermoplastics, particularly in polypropylene compositions. WO 2006/071721 discloses a thermoplastic composition comprising a polyolefin; a nucleating agent comprising a dicarboxylate salt compound, e.g. bicyclic [2.2.1] heptane dicarboxylate salt, available from Milliken & Company under the trade name Hyperform® HPN-68; a first fatty acid salt having a first cationic counter ion selected from the group consisting of calcium, sodium, lithium and barium, e.g. calcium stearate; and a second fatty acid salt having a second cationic counter ion selected from the group of magnesium, aluminium and zinc, e.g. zinc stearate.

Nucleating agents are chemical compounds or compositions that enable faster nucleation or a higher crystallization temperature of thermoplastic polymers, resulting in productivity gains during their processing and in improved mechanical and physical properties of articles made from such thermoplastics. These compounds provide nucleation sites for crystal growth during cooling of a thermoplastic molten composition. In polypropylenes, for example, a higher degree of crystallinity and more uniform crystalline structure is obtained by adding a nucleating agent such as talc and carboxylate salts, e.g. sodium benzoate. An overview of nucleating agents used in polypropylene-based compositions is given for example in *Polym. Adv. Technol.* 2007, 18, 685-695. However, it is commonly recognized that the use of nucleating agents is a highly unpredictable technology area. Small changes in a molecular structure of the nucleator can drastically alter the ability of a nucleating agent to nucleate effectively a polymer composition. There are still many unknowns regarding the effect of a nucleating agent on polymer morphology during (re-)crystallization of thermoplastics.

A nucleating composition is known from document EP 1379368 B1. This document discloses at least one metal salt of hexahydrophthalic acid (HHPA), e.g. calcium, strontium, lithium and monobasic aluminium salt, to be used as nucleating agent to produce thermoplastic compositions showing improved crystallization behaviour.

Several other documents also disclose metal salts employed as nucleating additives for thermoplastics. For example, US 2004/0220311 A1 discloses the use of a specific hexahydrophthalic acid metal salt, e.g. calcium, strontium, lithium, or monobasic aluminium, as nucleating agent in various thermoplastics, particularly in polypropylene compositions. WO 2006/071721 discloses a thermoplastic composition comprising a polyolefin; a nucleating agent comprising a dicarboxylate salt compound, e.g. bicyclic [2.2.1] heptane dicarboxylate salt, available from Milliken & Company under the trade name Hyperform® HPN-68; a first fatty acid salt having a first cationic counter ion selected from the group consisting of calcium, sodium, lithium and barium, e.g. calcium stearate; and a second fatty acid salt having a second cationic counter ion selected from the group of magnesium, aluminium and zinc, e.g. zinc stearate.

There is a demand for improving the mechanical properties of a thermoplastic composition such as the flexural modulus and the impact strength.

It is an object of the invention to provide a nucleating agent composition which results in highly improved mechanical properties of a thermoplastic composition such as the flexural modulus and the impact strength.

The objective is achieved according to the invention with a nucleating composition comprising:
(a) a first nucleating agent which comprises a cyclic dicarboxylate salt compound; and
(b) a second nucleating agent which comprises talc,
wherein the cyclic dicarboxylate salt compound has the formula (I):

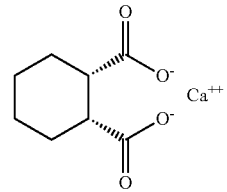 [SMILES: O=C([O-])[C@H]1CCCC[C@H]1C(=O)[O-] ; [Ca+2]]

Surprisingly, the nucleating composition of present invention results in highly improved mechanical properties such as stiffness and impact.

Document US 2007/0213439 A1 also discloses a nucleating composition comprising a mixture of two nucleating agents, the first nucleating agent comprising a dicarboxylate calcium salt, known as Hyperform® HPN-20E, but in this document the second nucleating agent comprises a bicyclic [2.2.1] heptane dicarboxylate salt, particularly Hyperform® HPN-68L. Also US 2008/0171834 A1 discloses a dicarboxylate calcium salt as first nucleating agent, but uses a bis-phenol phosphate compound as second nucleating agent in the nucleating composition. Thus, these references do not disclose nor suggest applying talc as nucleating agent in combination with a dicarboxylate calcium salt.

Additional advantages of the nucleating composition according to the present invention include decreased warpage of shaped articles made from a nucleated thermoplastic polymer composition; higher heat deflection temperature (HDT) and improved top load.

Additional advantages of the nucleating composition according to the present invention include a lower shrinkage caused by temperature change of shaped articles made from a nucleated thermoplastic polymer composition, as determined by Coefficient of Linear Thermal Expansion (CLTE) measured according to ASTM D696. The CLTE measures the change in length per unit length of a material per unit change in temperature. Expressed as in/in/° F. or cm/cm/° C., the CLTE is used to calculate the dimensional change resulting from thermal expansion. CLTE is especially important when components of an assembly have widely varying thermal expansion coefficients. Thermal expansion of a material is another important design factor, particularly in applications where plastic parts composed of polymer components are mated with metal parts or parts having metal inserts. Shrinkage can also be determined according to ISO 294-4 (shrinkage 3-D).

The advantages of the nucleating composition according to the present invention include one or combinations of the following favorable properties: flexural modulus, impact strength, CLTE and shrinkage.

The first nucleating agent in the composition according to the present invention comprises a calcium cis-hexahydrophthalate compound of Formula (I).

Hyperform® HPN-20E™ nucleating agent commercialized by Milliken comprises such a calcium cis-hexahydrophthalate compound of Formula (I) and a stearate-containing compound as acid scavenger, e.g. zinc stearate.

The nucleating composition according to the present invention comprises talc as second nucleating agent.

Talc is a common additive in industry, mostly used as reinforcing agent or filler and also as nucleating agent for various polymer compositions. Talc typically is considered a filler when employed in relatively high amounts, for example of about from 10 to 50 wt %, based on the total polymer composition. When talc is used under 5 wt %, it is no longer considered a filler but acts as nucleating agent.

Talc may be employed in present invention in powder form, preferably having a particle size distribution defined by a $d_{50}$ of from 0.1 to 20 μm; more preferably of from 0.5 to 15 μm; or from 0.7 to 8 μm to improve its nucleating behavior.

The first nucleating agent and the second nucleating agent can be present in the nucleating composition according to the invention in widely varying amounts, for example in a weight ratio of from 1:1200 to 2:1; preferably in a ratio of from 1:500 to 1:1; more preferably in a ratio of from 1:100 to 1:2; even more preferably in a ratio of from 1:50 to 1:5. The advantage of adding these components within these ratio limits lies in the possibility to control dimensional stability at fast cycle times and mechanical properties.

The nucleating composition may be employed as powder, dry mix or liquid blend. It may be also mixed with other additives to form an additive pre-blend or it may be blended with a binder material in low concentrations, such as a wax or thermoplastic polymer that is compatible with the polymer for which the composition is intended to serve as nucleating agent. The nucleating composition can also be combined with a thermoplastic polymer as a masterbatch or concentrate. These blends may be provided, optionally, with acid scavengers and other additives, such as stabilizers; primary and secondary antioxidants. Suitable acid scavengers can include zinc stearate, calcium stearate or other stearate-based compounds, and hydrotalcite.

The invention also relates to a thermoplastic polymer composition comprising a thermoplastic polymer and the nucleating composition according to present invention. As used herein, the term "thermoplastic" refers to a polymeric material that melts upon exposure to sufficiently high temperatures, but re-solidifies (crystallizes) upon cooling. "Thermoplastic" particularly defines polymers having (semi-)crystalline morphology upon cooling. Suitable examples of thermoplastic polymers include polyamides, such as polyamide-6, polyamide-6,6 or polyamide-4,6; polyolefins like polypropylenes, polyethylenes, polybutylene; polyesters, such as polyethylene terephthalate, polybutylene terephthalate; polyphenylene sulphide; polyurethanes; as well as any type of polymer blends and compounds and any combinations thereof. Preferably, the thermoplastic polymer is a crystallisable polypropylene, like a propylene homopolymer, a random copolymer, or a so-called heterophasic or impact copolymer of propylene and ethylene and/or another alpha-olefin.

In a preferred embodiment of the invention, the thermoplastic polymer is a heterophasic polypropylene copolymer. Such copolymer basically has at least a two-phase structure, consisting of a propylene-based semi-crystalline matrix and a dispersed elastomer phase, typically an ethylene-propylene rubber (EPR). These polypropylenes are generally prepared in one or more reactors, by polymerization of propylene in the presence of a catalyst system, and subsequent polymerization of a propylene-ethylene mixture; but can also be made by blending different (co)polymers. The resulting polymeric materials are heterophasic; studies have demonstrated the presence of four phases in heterophasic propylene-based copolymers: crystalline polypropylene, amorphous polypropylene, crystalline ethylene-propylene rubber, and amorphous ethylene-propylene rubber. The advantage of such polymer is improved impact resistance, especially at lower temperatures.

Preferably, the thermoplastic polymer is a heterophasic propylene copolymer comprising a matrix phase comprising propylene and a dispersed phase comprising an ethylene-alpha-olefin elastomer.

Preferably, the heterophasic propylene copolymer comprises from 60 to 92 wt % of a matrix phase comprising a propylene homopolymer and/or a propylene copolymer comprising at least 90 wt % of propylene and up to 10 wt % of ethylene and/or at least one $C_4$ to $C_{10}$ alpha-olefin, and from 8 to 40 wt % of dispersed phase comprising an ethylene-alpha-olefin elastomer comprising from 40 to 65 wt % of ethylene and from 35 to 60 wt % of at least one $C_3$ to $C_{10}$ alpha-olefin, preferably propylene. The percentage of matrix and dispersed component is based on the total weight of the heterophasic propylene copolymer; comonomer contents are based on copolymer component.

Preferably, the matrix phase is a propylene homopolymer and the mass dispersed phase is an ethylene-alpha-olefin elastomer comprising from 40 to 65 wt % of ethylene and from 35 to 60 wt % of propylene.

The thermoplastic polymer composition according to present invention preferably contains of from 0.0025 to 0.1 wt % of the first nucleating agent based on the total thermoplastic polymer composition. A certain minimum amount of the first nucleating agent is needed to effectively influence nucleating behaviour and properties the polymer composition further comprising talc as nucleating agent;

preferably, the nucleating composition contains therefore at least 0.004, 0.005, 0.008, 0.01 wt % of the first nucleating agent. Further increasing the amount of the first nucleating agent in the composition to above 0.1 wt % would hardly contribute to improving the properties of final product. Preferably, the nucleating composition thus contains at most 0.08, 0.06, 0.05, 0.03 wt % of the first nucleating agent. It is a special advantage of the present invention that a relatively low amount of the first nucleating agent can be applied, in combination with the talc-based second nucleating agent; giving not only improved performance but also reducing costs.

The amount of talc used as second nucleating agent in the polymer composition is preferably of from 0.1 to 5 wt %, more preferably from 0.2 to 4 wt %; or from 0.3 to 3 wt %, based on the total thermoplastic polymer composition. A certain minimum amount of talc is necessary to provide nucleating effect and good mechanical characteristics, such as stiffness. Preferably, the nucleation composition contains thus at least 0.2, 0.3 or even 0.5 wt % of talc. If the nucleating composition would contain more than 5 wt % of talc, the additional amount might only behave as filler agent. Preferably, the nucleation composition contains therefore at most 4 or 3 wt % of talc.

The heterophasic propylene copolymer of the thermoplastic polymer composition according to the invention preferably has a MFI of less than 1 dg/min as determined by ISO 1133 at 230° C.; 2.16 kg. The MFI of the heterophasic propylene copolymer may e.g. be 0.1 to 0.5 dg/min.

The thermoplastic polymer composition according to the invention preferably comprises no or substantially no amount of organic peroxide. The term 'substantially no amount of organic peroxide may mean less than 0.01 wt % of the total composition.

The composition according to the invention comprising this type of propylene copolymer having a low MFI is especially useful for pipes, in particular sewerage and drainage pipes. These applications typically demand good impact resistance (fulfilled according to EN 1852 & EN 13476) at handing temperature, high ring stiffness for good dimension stability (in particular important for the outer layer of the pipes), excellent processability, good chemical resistance, good thermo oxidative resistance, good shrinkage properties and/or low specific weight. The plastic pipe producers are actively trying to gain market shares from traditional materials in the sewerage pipe market (i.e. clay, concrete and cast iron). Typical applications are corrugated pipes and solid waste water pipes. Accordingly, the present invention relates to pipes comprising the thermoplastic polymer composition according to the invention comprising this type of propylene copolymer.

Preferably, the propylene homopolymer of the matrix phase has a MFI of less than 1 dg/min, e.g. 0.1 to 0.5 dg/min.

Preferably, the ethylene-alpha-olefin elastomer of the dispersed phase has a MFI of 0.001 to 0.1 dg/min.

The thermoplastic polymer composition according to the invention preferably has a density in the range from 890 to 920, for example from 900 to 910 kg/m$^3$, for example has a density of about 905 kg/m3.

The thermoplastic polymer composition according to the invention has good thermo oxidative resistance, for example an oxidative resistance (OIT) of at least 100 min as measured using EN 728:1997.

The thermoplastic polymer composition according to the invention preferably has a good pressure resistance as determined according to EN 1852 (20 & 110 mm pipes) at 80° C. (for example at least 140 hours at 4.2 MPa, preferably at least 1000 hours at 4.2 MPa) and 95° C. (for example at least 3000 hours at 2.5 MPa, hours), The thermoplastic polymer composition according to the invention has a MFI similar to the MFI of the heterophasic propylene copolymer in the thermoplastic polymer composition. The MFI of the thermoplastic polymer composition according to the invention may be less than 1 dg/min, e.g. 0.1-0.5 dg/min.

The thermoplastic polymer composition according to the invention has a high stiffness. For purpose of the present invention, stiffness is determined by measuring the flexural modulus according to ASTM D790-10. Flexural modulus was determined on 3.2 mm thick specimens according to ISO37/2, parallel (flexural modulus II) and perpendicular (flexural modulus L) orientation.

The thermoplastic polymer composition according to the invention preferably has a flexural modulus L of at least 1500 MPa, preferably at least 1600 MPa, more preferably at least 1700 MPa, more preferably at least 1800 MPa, for example at least 1850 MPa.

The thermoplastic polymer composition according to the invention preferably has a flexural modulus II of at least 1500 MPa, preferably at least 1600 MPa, more preferably at least 1700 MPa, more preferably at least 1800 MPa.

The thermoplastic polymer composition according to the invention has a sufficient degree of impact strength. For purpose of the present invention, impact strength is determined by measuring the Izod impact strength at 23° C. according to ISO 180 4A, Test geometry: 65*12.7*3.2 mm, notch 45° according to ISO 37/2 parallel (impact strength II) and perpendicular (impact strength L) orientation.

The thermoplastic polymer composition according to the invention preferably has an Izod impact strength L (23° C., kJ/m$^2$) of at least 10, preferably at least 12, more preferably at least 16.

The thermoplastic polymer composition according to the invention preferably has an Izod impact strength II (23° C., kJ/m$^2$) of at least 3, preferably at least 4, more preferably at least 4.5.

The thermoplastic polymer composition according to the invention preferably has a Charpy notched impact strength as determined at 23° C. using ISO179-1:2010 of at least 50 kJ/m$^2$, for example of about 60 kJ/m$^2$ and/or wherein the thermoplastic polymer composition has a Charpy notched impact strength as determined at 0° C. of at least 25 kJ/m$^2$, for example of about 35 kJ/m$^2$ at 0° C. as determined using ISO179-1:2010 and/or wherein the thermoplastic polymer composition has a Charpy notched impact strength as determined at −20° C. using ISO179-1:2010 of at least 5 kJ/m$^2$, for example of about 6 kJ/m$^2$ The invention also relates to an article, preferably a pipe comprising the thermoplastic polymer composition of the invention, preferably wherein the article has a thermo oxidative resistance as measured using EN 728:1997 of at least 100 min and/or
wherein the article has a pressure resistance as determined according to EN 1852 (20 & 110 mm pipes) at 80° C. of at least 1000 hours at 4.2 MPa and/or wherein the article has a pressure resistance as determined according to EN1852 (20 & 100 mm piped) at 95° C. of at least 3000 hours at 2.5 MPa, hours and/or
wherein the thermoplastic polymer composition has a Charpy notched impact strength as determined using ISO179-1:2010 of at least 50 kJ/m$^2$, for example of about 60 kJ/m$^2$ at 23° C. and/or
wherein the thermoplastic polymer composition has a Charpy notched impact strength as determined at 0° C. using ISO179-1:2010 of at least 25 kJ/m$^2$, for example of about 35 kJ/m$^2$ and/or
wherein the thermoplastic polymer composition has a Charpy notched impact strength as determined at −20° C. using ISO179-1:2010 of at least 5 kJ/m$^2$, for example of about 6 kJ/m$^2$ at −20° C.

The thermoplastic polymer composition according to the invention may contain other additives, of which suitable example include clarifiers, stabilizers, e.g. UV stabilizers, acid scavenger, release agents, plasticizers, anti-oxidants, lubricants, anti-statics, scratch resistance agents, recycling additives, coupling agents, anti-microbials, anti-fogging additives, slip additives, anti-blocking additives, polymer processing aids, organic peroxides to control melt rheology, and the like. Such additives are well known in the art. The skilled person will know how to employ these additives in conventional effective amounts.

The thermoplastic polymer composition according to the invention may also contain one or more of usual additives, like those mentioned above, including stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; impact modifiers; blowing agents; fillers and reinforcing agents; and/or components that enhance interfacial bonding between polymer and filler, such as a maleated polypropylene, in case the thermoplastic polymer is a polypropylene composition. The skilled person can readily select any suitable combination of additives and additive amounts without undue experimentation. The amount of additives depends on their type and function; typically is of from 0 to about 30 wt %; preferably of from 0 to about 20 wt %; more preferably of from 0 to about 10 wt % and most preferably of from 0 to about 5 wt % based on the total composition.

The thermoplastic polymer composition of the invention may be obtained by mixing the nucleating composition according to present invention with the thermoplastic polymer, and optionally other additives by using any suitable means. Preferably, the thermoplastic polymer composition of the invention is made in a form that allows easy processing into a shaped article in a subsequent step, like in pellet or granular form. The composition can be a mixture of different particles or pellets; like a blend of a thermoplastic polymer and a masterbatch of nucleating agent composition, or a blend of pellets of a thermoplastic polymer comprising one of the two nucleating agents and a particulate comprising the other nucleating agent, possibly pellets of a thermoplastic polymer comprising said other nucleating agent. Preferably, the thermoplastic polymer composition of the invention is in pellet or granular form as obtained by mixing all components in an apparatus like an extruder; the advantage being a composition with homogeneous and well-defined concentrations of the nucleating agents (and other components).

The thermoplastic polymer composition may then be processed by any conventional technique known in the art into a shaped article. Suitable examples include injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, and thermoforming.

The invention therefore further relates to a shaped article comprising the thermoplastic polymer composition according to the invention. Examples of shaped articles include injection-moulded products, extruded films, profiles or pipes, and thermoformed cups.

Particularly suitable articles are pipes, in particular sewage and drainage pipes. Accordingly, the present invention relates to pipes comprising the thermoplastic polymer composition according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The range of values "A to B" used herein is understood to mean "at least A and at most B".

The invention is now elucidated by way of the following examples, without however being limited thereto.

EXAMPLES

Example 1

Several samples were prepared using a starting material having a melt flow index (MFI) of 0.32 dg/min. This material is a propylene heterophasic copolymer having a propylene polymer matrix wherein the propylene-based matrix (in this case a propylene homopolymer) is present in an amount of 91 wt % based on the total heterophasic propylene copolymer and 9 wt % of an ethylene-propylene copolymer consisting of 58 wt % of ethylene.

The heterophasic propylene copolymer (3.75 kg) was extruded in a twin screw ZE21 extruder with 2.5 wt % talcum (Imerys steamic OOSD/G fine talcum). The formulation of these materials contained in addition 500 ppm of the processing aid Calcium stearate, 500 ppm of the processing aid zinc stearate, 4000 ppm of the stabilizer Irganox 1010 and 1500 ppm of stabilizer Irgafos 168 and 250 ppm HPN20E. Additives, talc and nucleating agent were mixed with the heterophasic copolymer prior to dosing it to the hopper of the extruder.

The temperature profile in the extruder was 20-20-30-50-100-170-220-220-240° C., at a throughput of 2.5 kg/h at 300 rpm.

For purpose of the present invention, stiffness is determined by measuring the flexural modulus according to ASTM D790-10. Flexural modulus was determined on 3.2 mm thick specimens according to ISO37/2, parallel and perpendicular orientation.

For purpose of the present invention, impact strength is determined by measuring the Izod impact strength at 23° C. according to ISO 180 4A, Test geometry: 65*12.7*3.2 mm, notch 45° according to ISO 37/2 parallel and perpendicular orientation.

For purpose of the present invention, flow is determined by measuring the melt flow rate, also called melt flow index or melt index according to ISO1133 (2.16 kg/230° C.).

For purpose of the present invention, CLTE is measured according to ASTM D696 in parallel and perpendicular direction. Two types of temperature changes are used for the measurements: a temperature change from 20° C. to 80° C. and a temperature change from −30° C. to 30° C.

For purpose of the present invention, shrinkage 3-D is measured according to ISO 294-4. Two types of shrinkage are measured: shrinkage after 24 hours at 23° C. and shrinkage after 24 hours at 23° C. followed by 1 hour at 90° C.

The results are summarized in Table 1 and 2. In the Tables:

RC is the rubber content (propylene-ethylene copolymer) in the heterophasic copolymer; RCC2 is the C2 (ethylene) content in the rubber part of the polymer.

RC and RCC2 were measured with IR spectroscopy, which was calibrated using NMR according to known procedures.

MFI heterophasic copolymer is the MFI of the starting heterophasic copolymer consisting of the matrix and the rubber.

MFI final is the MFI of the final extruded composition of the heterophasic copolymer and additives such as talc, nucleating composition and peroxide.

Properties in the parallel and perpendicular directions are indicated with "II" and "L", respectively.

COMPARATIVE EXPERIMENTS

Comparative experiments were performed and properties were measured as summarized in Tables 1 and 2.

TABLE 1

|  | CEx 1 | CEx 2 | CEx 3 | Ex 1 | CEx 4 | CEx 5 |
| --- | --- | --- | --- | --- | --- | --- |
| Matrix (wt % based on the heterophasic copolymer) | 91.0 | 91.0 | 91.0 | 91.0 | 91.0 | 91.0 |
| RC (wt % based on the heterophasic copolymer) | 9.0 | 9.0 | 9.0 | 9.0 | 9.0 | 9.0 |
| RCC2 (wt %) | 58 | 58 | 58 | 58 | 58 | 58 |
| MFI matrix (dg/min) | 0.44 | 0.44 | 0.44 | 0.44 | 0.44 | 0.44 |
| MFI rubber (dg/min) | 0.006 | 0.006 | 0.006 | 0.006 | 0.006 | 0.006 |
| MFI heterophasic copolymer (dg/min) | 0.32 | 0.32 | 0.32 | 0.32 | 0.32 | 0.32 |
| Talc (wt %) | 0 | 2.5 | 0 | 2.5 | 0 | 2.5 |
| HPN20 (wt %) | 0 | 0 | 0.05 | 0.05 | 0 | 0 |
| ADK NA27 (wt %) | 0 | 0 | 0 | 0 | 0.1 | 0.1 |
| Additives (wt %, stabilizer Irganox1010) | 0.4 | 0.4 | 0.4 | 0.4 | 0.4 | 0.4 |
| Stabilizer Irgafos 168 (wt %) | 0.15 | 0.15 | 0.15 | 0.15 | 0.15 | 0.15 |
| Acid scavenger Calcium Stearate (wt %) | 0.05 | 0.05 | 0.05 | 0.05 | 0.05 | 0.05 |
| Acid scavenger Zn Stearate (wt %) | 0.05 | 0.05 | 0.05 | 0.05 | 0.05 | 0.05 |
| Flexural Modulus L (MPa) | 1504 | 1805 | 1755 | 1854 | 1591 | 1694 |
| Flexural Modulus II (MPa) | 1542 | 1813 | 1740 | 1849 | 1823 | 1916 |
| Izod Impact L (23° C., kJ/m$^2$) | 12.43 | 14.8 | 19.8 | 18.0 | 16.4 | 17.8 |
| Izod Impact II (−20° C., kJ/m$^2$) | 4.6 | 4.8 | 5.2 | 4.7 | 5.11 | 4.77 |

Comparison of CEx 2, CEx 3 and Ex 1 shows that the combination of talc and HPN20 has a synergistic effect on the flexural modulus. The impact strength is also increased.

Comparison of CEx 1 and CEx 4 shows that ADK NA27 also increases the flexural modulus, but increase in the flexural modulus L is very small.

Comparison of CEx 1, Ex 1 and CEx 5 also shows that the combination of talc and HPN20 results in a large increase of both flexural modulus L and II, whereas the combination of talc and ADK NA27 results only in a large increase of flexural modulus II and not flexural modulus L.

TABLE 2

|  | CEx 6 | CEx 7 | CEx 8 | CEx 9 | Ex 2 | CEx 10 | Ex 3 |
|---|---|---|---|---|---|---|---|
| Matrix (wt % based on the heterophasic copolymer) | 91.0 | 91.0 | 91.0 | 91.0 | 91.0 | 91.0 | 91.0 |
| RC (wt % based on the heterophasic copolymer) | 9.0 | 9.0 | 9.0 | 9.0 | 9.0 | 9.0 | 9.0 |
| RCC2 (wt %) | 58 | 58 | 58 | 58 | 58 | 58 | 58 |
| MFI matrix (dg/min) | 0.44 | 0.44 | 0.44 | 0.44 | 0.44 | 0.44 | 0.44 |
| MFI rubber (dg/min) | 0.006 | 0.006 | 0.006 | 0.006 | 0.006 | 0.006 | 0.006 |
| MFI heterophasic copolymer (dg/min) | 0.36 | 0.36 | 0.38 | 0.37 | 0.40 | 0.36 | 0.39 |
| Talc (wt %) | 0 | 0.5 | 0 | 0 | 0.5 | 0.5 | 5 |
| HPN20E (wt %) | 0 | 0 | 0.025 | 0 | 0.025 | 0 | 0.025 |
| HPN68L (wt %) | 0 | 0 | 0 | 0.05 | 0 | 0.05 | 0 |
| Additives (wt %, stabilizer Irganox1010) | 0.4 | 0.4 | 0.4 | 0.4 | 0.4 | 0.4 | 0.4 |
| Stabilizer Irgafos 168 (wt %) | 0.15 | 0.15 | 0.15 | 0.15 | 0.15 | 0.15 | 0.15 |
| Acid scavenger Calcium Stearate (wt %) | 0.05 | 0.05 | 0.05 | 0.05 | 0.05 | 0.05 | 0.05 |
| Acid scavenger Zn Stearate (wt %) | 0.05 | 0.05 | 0.05 | 0.05 | 0.05 | 0.05 | 0.05 |
| Flexural Modulus L (23° C., MPa) | 1604 | 1696 | 1775 | 1625 | 1844 | 1747 | 1975 |
| Flexural Modulus II (23° C., MPa) | 1666 | 1715 | 1752 | 1769 | 1826 | 1864 | 2001 |
| Izod Impact L (23° C., kJ/m$^2$) | 12.36 | 12.08 | 15.63 | 11.03 | 14.65 | 9.91 | 15.09 |
| CLTE 20° C.-80° C. (μm/m · K) | 140.0 | 128.4 | 115.4 | 152.8 | 114.9 | 150.5 | 114.41 |
| CLTE −30° C.-30° C. (μm/m · K) | 101.7 | 90.7 | 77.8 | 112.3 | 76.8 | 112.1 | 73.529 |
| Shrinkage after 24 hrs at 23° C. L (%) | 2.0898 | 1.9106 | 1.4405 | 1.9293 | 1.4352 | 1.9079 | 1.4434 |
| Shrinkage after 24 hrs at 23° C. + 1 hr at 90° C. L (%) | 2.0976 | 1.9470 | 1.5816 | 2.2071 | 1.5867 | 2.1817 | 1.5866 |

Comparison of CEx 7, CEx 8 and Ex 2 shows that the combination of talc and HPN20 has a synergistic effect on the flexural modulus.

Comparison of Ex 2 and CEx 10 shows that the combination of talc and HPN20 is superior than the combination of talc and HPN68 in terms of impact strength, CLTE and shrinkage. Furthermore, the combination of talc and HPN20 results in similar flexural modulus L and II, in comparison with the combination of talc and HPN68 which results in a large difference between flexural modulus L and II. The large difference between flexural modulus L and II causes a large internal stress which is unfavorable.

Comparison of CEx 6, Ex2 and CEx10 also shows that the combination of talc and HPN20 results in large improvements on the flexural modulus as well as impact strength, CLTE and shrinkage, whereas the combination of talc and HPN 68 results in worsening of CLTE and shrinkage.

The invention claimed is:

1. A thermoplastic polymer composition comprising
a thermoplastic polymer and
a nucleating composition comprising:
   (a) a first nucleating agent, which comprises a cyclic dicarboxylate salt compound; and
   (b) a second nucleating agent, which comprises talc,
   wherein the cyclic dicarboxylate salt compound has the formula (I):

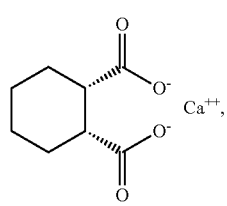

(I)

and wherein the amount of the first nucleating agent is from 0.025 to 0.05 wt %,
wherein the amount of the second nucleating agent is from 2.5 to 5 wt %,
wherein a weight ratio of the first nucleating agent to the second nucleating agent is from 1:200 to 1:50,
wherein said thermoplastic polymer is a heterophasic propylene copolymer comprising a matrix phase comprising propylene and a dispersed phase comprising an ethylene-alpha-olefin elastomer,
wherein the heterophasic propylene copolymer comprises from 60 to 92 wt % of the matrix phase and from 8 to 40 wt % of the dispersed phase,
wherein the matrix phase comprises a propylene homopolymer and/or a propylene copolymer comprising at least 90 wt % of propylene and up to 10 wt % ethylene and/or at least one $C_4$ to $C_{10}$ alpha-olefin, and
wherein the ethylene-alpha-olefin elastomer of the dispersed phase comprises from 40 to 65 wt % of ethylene and from 35 to 60 wt % of at least one $C_3$ to $C_{10}$ alpha-olefin.

2. The thermoplastic polymer composition according to claim 1,
wherein the heterophasic propylene copolymer comprises from 60 to 91 wt % of the matrix phase and from 9 to 40 wt % of the dispersed phase,
wherein the matrix phase comprises a propylene homopolymer and/or a propylene copolymer comprising at least 90 wt % of propylene and up to 10 wt % ethylene and/or at least one $C_4$ to $C_{10}$ alpha-olefin and
wherein the ethylene-alpha-olefin elastomer of the dispersed phase comprises from 40 to 65 wt % of ethylene and from 35 to 60 wt % of at least one $C_3$ to $C_{10}$ alpha-olefin.

3. The thermoplastic polymer composition according to claim 2,
wherein the heterophasic propylene copolymer has a MFI of less than 1 dg/min as determined by ISO 1133 at 230° C.; 2.16 kg.

4. The thermoplastic polymer composition according to claim 3,
wherein the matrix phase has a MFI of less than 1 dg/min as determined by ISO 1133 at 230° C.; 2.16 kg.

5. The thermoplastic polymer composition according to claim 4,
wherein the ethylene-alpha-olefin elastomer of the dispersed phase has a MFI of 0.001 to 0.1 dg/min as determined by ISO 1133 at 230° C.; 2.16 kg.

6. The thermoplastic polymer composition according to claim 5,
wherein the thermoplastic polymer composition has a MFI of 0.1 to 0.5 dg/min as determined by ISO 1133 at 230° C.; 2.16 kg.

7. The thermoplastic polymer composition according to claim 6,
wherein the thermoplastic polymer composition has a flexural modulus in a perpendicular orientation of at least 1500 MPa as determined by ASTM D790-10.

8. The thermoplastic polymer composition according to claim 7,
wherein the thermoplastic polymer composition has an Izod impact strength in a perpendicular orientation (23° C., kJ/m$^2$) of at least 10 according to ISO 180 4A.

9. The thermoplastic polymer composition according to claim 8,
wherein the amount of the second nucleating agent is from 2.5 to 3 wt %.

10. The thermoplastic polymer composition according to claim 9,
wherein the thermoplastic polymer composition has a flexural modulus in the perpendicular orientation of at least 1600 MPa as determined by ASTM D790-10 and an Izod impact strength in the perpendicular orientation (23° C., kJ/m$^2$) of at least 12 according to ISO 180 4A.

11. The thermoplastic polymer composition according to claim 10,
wherein the thermoplastic polymer composition has a flexural modulus in the perpendicular orientation of at least 1800 MPa as determined by ASTM D790-10 and an Izod impact strength in the perpendicular orientation (23° C., kJ/m$^2$) of at least 16 according to ISO 180 4A.

12. The thermoplastic polymer composition according to claim 1,
wherein
the thermoplastic polymer composition has a flexural modulus in a perpendicular orientation of at least 1500 MPa as determined by ASTM D790-10 and an Izod impact strength in the perpendicular orientation (23° C., kJ/m$^2$) of at least 10 according to ISO 180 4A; and
said thermoplastic polymer has a MFI of 0.1 to 0.5 dg/min as determined by ISO 1133 at 230° C.; 2.16 kg, wherein
the heterophasic propylene copolymer comprises from 60 to 91 wt % of the matrix phase and from 9 to 40 wt % of the dispersed phase, and has a MFI of less than 1 dg/min as determined by ISO 1133 at 230° C.; 2.16 kg,
the matrix phase comprises a propylene homopolymer and/or a propylene copolymer comprising at least 90 wt % of propylene and up to 10 wt % ethylene and/or at least one $C_4$ to $C_{10}$ alpha-olefin, and has a MFI of less than 1 dg/min as determined by ISO 1133 at 230° C.; 2.16 kg, and
the ethylene-alpha-olefin elastomer of the dispersed phase comprises from 40 to 65 wt % of ethylene and from 35 to 60 wt % of polypropylene, and has a MFI of 0.001 to 0.1 dg/min as determined by ISO 1133 at 230° C.; 2.16 kg.

13. The thermoplastic polymer composition according to claim 12,
wherein
the heterophasic propylene copolymer has MFI of 0.32 to 0.40 dg/min as determined by ISO 1133 at 230° C.; 2.16 kg,
the thermoplastic polymer composition has a flexural modulus in a perpendicular orientation of 1844 to 1975 MPa as determined by ASTM D790-10, and
the thermoplastic polymer composition has an Izod impact strength in a perpendicular orientation (23° C., kJ/m$^2$) of 14.65 to 18.0 according to ISO 180 4A.

14. The thermoplastic polymer composition according to claim 1,
wherein
the heterophasic propylene copolymer has MFI of 0.32 to 0.40 dg/min as determined by ISO 1133 at 230° C.; 2.16 kg,
the thermoplastic polymer composition has a flexural modulus in a perpendicular orientation of 1844 to 1975 MPa as determined by ASTM D790-10, and
the thermoplastic polymer composition has an Izod impact strength in a perpendicular orientation (23° C., kJ/m$^2$) of 14.65 to 18.0 according to ISO 180 4A.

15. The thermoplastic polymer composition according to claim 1,
wherein the thermoplastic polymer composition has an Izod impact strength in the perpendicular orientation (23° C., kJ/m$^2$) of at least 16 according to ISO 180 4A.

16. A shaped article comprising the thermoplastic polymer composition according to claim 1,
wherein the article has a thermo oxidative resistance as measured using EN 728:1997 of at least 100 min and/or wherein the article has a pressure resistance as determined according to EN 1852 (20 and 110 mm pipes) at 80° C. of at least 1000 hours at 4.2 MPa and/or wherein the article has a pressure resistance as determined according to EN1852 (20 and 100 mm pipes) at 95° C. of at least 3000 hours at 2.5 MPa and/or wherein the thermoplastic polymer composition has a Charpy notched impact strength as determined using ISO179-1:2010 of at least 50 kJ/m² at 23° C. and/or wherein the thermoplastic polymer composition has a Charpy notched impact strength as determined at 0° C. using ISO179-1:2010 of at least 25 kJ/m², for example of about 35 kJ/m² and/or wherein the thermoplastic polymer composition has a Charpy notched impact strength as determined at −20° C. using ISO179-1:2010 of at least 5 kJ/m² at −20° C.

17. The shaped article according to claim 16, wherein the article is a pipe.

18. The shaped article according to claim 16, wherein the thermoplastic polymer composition has a Charpy notched impact strength as determined using ISO179-1:2010 of at least 60 kJ/m² at 23° C.; and a Charpy notched impact strength as determined at −20° C. using ISO179-1:2010 of at least 6 kJ/m² at −20° C.

19. A shaped article comprising the thermoplastic polymer composition according to claim 12, wherein the shaped article has
 a thermo oxidative resistance as measured using EN 728:1997 of at least 100 min,
 a pressure resistance as determined according to EN 1852 (20 and 110 mm pipes) at 80° C. of at least 1000 hours at 4.2 MPa, and
 a pressure resistance as determined according to EN1852 (20 and 100 mm pipes) at 95° C. of at least 3000 hours at 2.5 MPa, hours;
and wherein the shaped article is a pipe.

* * * * *